US009932105B2

(12) United States Patent
Maltinti et al.

(10) Patent No.: US 9,932,105 B2
(45) Date of Patent: Apr. 3, 2018

(54) DEVICE FOR FOLDING/UNFOLDING A TAIL BOOM OF A ROTORCRAFT, AN ASSOCIATED ROTORCRAFT, AND A CORRESPONDING FOLDING/UNFOLDING METHOD

(71) Applicant: AIRBUS HELICOPTERS, Marignane (FR)

(72) Inventors: Maxime Maltinti, Tarascon (FR); Florian Poggioli, Vernegues (FR)

(73) Assignee: AIRBUS HELICOPTERS, Marignane (FR)

( * ) Notice: Subject to any disclaimer, the term of this patent is extended or adjusted under 35 U.S.C. 154(b) by 191 days.

(21) Appl. No.: 15/083,568

(22) Filed: Mar. 29, 2016

(65) Prior Publication Data
US 2016/0332719 A1 Nov. 17, 2016

(30) Foreign Application Priority Data

Mar. 31, 2015 (FR) ..................................... 15 00642

(51) Int. Cl.
*B64C 27/00* (2006.01)
*B64C 1/30* (2006.01)
(Continued)

(52) U.S. Cl.
CPC ............... *B64C 1/30* (2013.01); *B64C 27/08* (2013.01); *B64C 27/82* (2013.01); *B64C 1/063* (2013.01); *B64C 27/06* (2013.01)

(58) Field of Classification Search
CPC .. B64C 1/26; B64C 1/30; B64C 1/063; B64C 27/06
See application file for complete search history.

(56) References Cited

U.S. PATENT DOCUMENTS 3,981,158 A * 9/1976 Watson .................. B64C 27/82
192/114 T
4,245,801 A 1/1981 Mulvey
(Continued)

FOREIGN PATENT DOCUMENTS

DE 19647166 5/1997
EP 0894711 A2 2/1999
(Continued)

OTHER PUBLICATIONS

French Search Report for French Application No. FR 1500642, Completed by the French Patent Office on Feb. 9, 2016, 7 Pages.
(Continued)

*Primary Examiner* — Richard G Davis
(74) *Attorney, Agent, or Firm* — Brooks Kushman P.C.

(57) ABSTRACT

A folding/unfolding device for folding/unfolding a tail boom, the device being arranged in association with a rear power transmission shaft of a tail rotor of the rotorcraft, the folding/unfolding device comprising pivot means enabling a movable portion of the tail boom to move in pivoting relative to a stationary portion of the tail boom, the relative pivoting movement being performed between two distinct extreme positions, namely an unfolded, working position enabling the rear power transmission shaft to transmit driving torque to the tail rotor, and a folded, rest position enabling the overall length of the rotorcraft to be reduced. According to the invention, the folding/unfolding device includes motor-driven decoupling/coupling means for mechanically decoupling/coupling together two portions of a single rear power transmission shaft before/after the relative pivoting movement of the movable portion of the tail boom relative to the stationary portion.

16 Claims, 4 Drawing Sheets

(51) Int. Cl.
*B64C 27/08* (2006.01)
*B64C 27/82* (2006.01)
*B64C 1/06* (2006.01)
*B64C 27/06* (2006.01)

(56) References Cited

U.S. PATENT DOCUMENTS 5,360,376 A * 11/1994 Baldino ............... F16D 11/10
                                                                               464/154
5,672,112 A    9/1997 Sbabo
6,050,521 A * 4/2000 Regonini ............... B64C 1/063
                                                                               244/120

FOREIGN PATENT DOCUMENTS

EP         0894711 A3   10/1999
KR       100692237     3/2007

OTHER PUBLICATIONS

Notice of Preliminary Rejection for Korean Application No. 10-2016-0039154, dated Jul. 1, 2017, 3 Pages.

* cited by examiner

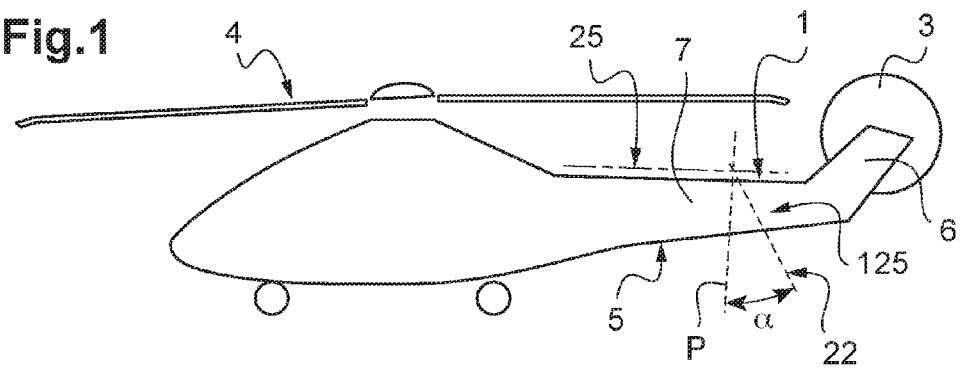
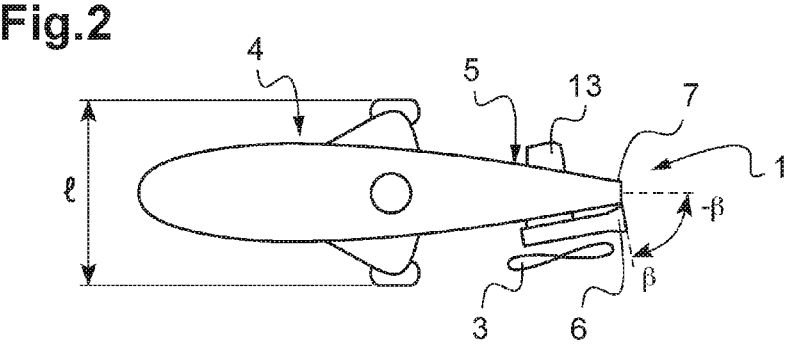
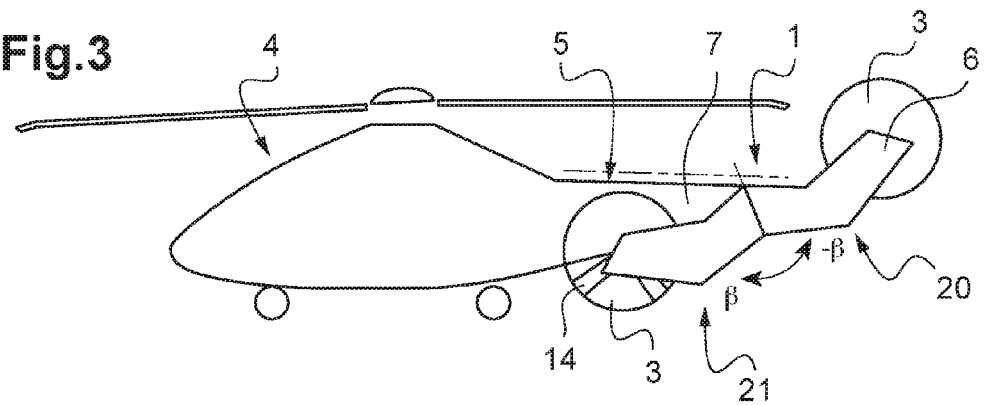

DEVICE FOR FOLDING/UNFOLDING A TAIL BOOM OF A ROTORCRAFT, AN ASSOCIATED ROTORCRAFT, AND A CORRESPONDING FOLDING/UNFOLDING METHOD

CROSS REFERENCE TO RELATED APPLICATION

This application claims priority to French patent application No. FR 15 00642 filed on Mar. 31, 2015, the disclosure of which is incorporated in its entirety by reference herein.

BACKGROUND OF THE INVENTION

(1) Field of the Invention

The present invention relates to the field of rotorcraft that are generally fitted with one or more power plants, a main power transmission gearbox, at least one main power transmission shaft driving a main rotor in rotation that is suitable for providing the rotorcraft at least with lift, at least one rear power transmission shaft, and at least one rear power transmission gearbox that drives rotation of a tail rotor of the rotorcraft for controlling yaw movement of the rotorcraft, in particular a helicopter, about a yaw axis.

(2) Description of Related Art

In certain particular situations, such a rotorcraft may also include an intermediate power transmission gearbox arranged in a tail boom on a power transmission line, upstream from the rear power transmission gearbox and downstream from the main power transmission gearbox. Such an intermediate power transmission gearbox thus forms an angle drive take-off referred to as a "right-angle power transmission gearbox" and it is used when the axis of rotation of the tail rotor is vertically offset relative to a longitudinal direction of the tail boom of the rotorcraft, e.g. above a plane in which the rear power transmission shaft lies.

The invention relates more particularly to a reversible folding/unfolding device for fitting to the rear power transmission shaft.

In addition, such a folding/unfolding device is intrinsically arranged at a junction between two portions of the tail boom of the rotorcraft. Thus, a first tail boom portion is secured to the fuselage of the rotorcraft and is stationary relative thereto. A second tail boom portion is movable in pivoting about an axis relative to the stationary portion.

Such a folding/unfolding device thus enables the overall length of the rotorcraft to be shortened when the movable portion of the tail boom is arranged in a folded position. This folding/unfolding device thus makes it possible to make a tail boom foldable when the rotors of the rotorcraft are stopped, thereby improving the compactness of rotorcraft while they are being transported or stored in compartments that are narrow and confined, such as in particular in the holds of ships or of cargo airplanes, and in hangars.

Generally, and as described in particular in Document KR 100 692 237, the tail boom of a rotorcraft is folded/unfolded about a pivot axis that lies substantially in a transverse plane perpendicular to a longitudinal direction of the power transmission shaft for transmitting driving torque to the tail rotor of the rotorcraft.

Nevertheless, when the pivot axis lies in such a transverse plane that is perpendicular to the rear power transmission shaft, the presence of a horizontal stabilizer, such as a tail plane arranged close to the tail rotor, can give rise to mechanical interference by coming into abutment against the stationary portion of the tail boom.

Such a horizontal stabilizer emerges substantially radially from a longitudinal direction of the tail boom and constitutes a transverse tail plane that is horizontal or substantially horizontal, or else that is inclined. Furthermore, such a horizontal stabilizer may be arranged asymmetrically or symmetrically on either side of the tail boom.

Thus, when folding the tail boom, the movable portion cannot be folded against the stationary portion through an angle of 180°. Because of the horizontal stabilizer, and because of mechanical interference between the two portions of the tail boom resulting therefrom, the folding/unfolding angle about the pivot axis can be no more than 120°. This limit on the folding/unfolding angle then gives the rotorcraft considerable width that may even be greater than the width of the cockpit.

Thus, with that type of folding/unfolding device, the overall length can be shortened, but under some circumstances, the overall width can be increased.

In order to mitigate those problems, and as described in Documents EP 0 894 711, DE 196 47 166, U.S. Pat. No. 4,245,801, and U.S. Pat. No. 5,360,376, coupling devices have been designed in which the pivot connection between the movable portion and the stationary portion is about a pivot axis that is inclined relative to the above-defined transverse plane. By inclining the pivot axis at an angle of about 16 degrees to 17 degrees, it becomes possible to cause the horizontal stabilizer arranged on the movable portion to pass under the stationary portion of the tail boom. Such an arrangement thus enables the folding/unfolding angle of the tail boom to be increased, and consequently makes it possible to reduce the overall width of the rotorcraft.

Nevertheless, in order to enable the movable portion of the tail boom to pivot relative to the stationary portion, the rear power transmission shaft needs to be mechanically decoupled or declutched so as to be separated into two portions. Such a declutching action is generally obtained by means of a jaw clutch that is movable in translation along the longitudinal direction of the rear power transmission shaft. Specifically the pivot connection between the two portions of the tail boom that is inclined relative to the plane perpendicular to the longitudinal direction of the rear power transmission shaft then gives rise to interference between the two portions of the rear power transmission shaft.

Patent EP 0 894 711 describes such a folding/unfolding device that includes in particular a jaw clutch that is movable in translation along a longitudinal direction parallel to the rear power transmission shaft.

Furthermore, in that example, on being repositioned while closing its movable portion, the tail boom makes it possible to ensure proper alignment of the set of rear power transmission shafts. The coupling/decoupling function is not correlated with the necessary locking of the tail boom in the unfolded, coupled position, i.e. in the flight configuration of the rotorcraft.

Furthermore, since the two portions of the rear power transmission shaft of the tail boom pivot relative to each other about a pivot axis that is inclined relative to the perpendicular transverse plane, mechanical coupling is provided by a conical guide element together with sets of teeth presenting a profile in the form of a circular arc. Such conical guidance also includes resilient axial support means for making it possible to bring the sets of teeth axially into coincidence when the movable portion of the tail boom is engaged facing the stationary portion.

In the rear power transmission shaft, the cone of the stationary portion possesses a large backing stroke and makes it possible to achieve automatic centering with the reception cone of the movable portion. The cone of the stationary portion then comes into contact with the internal abutment of the reception cone of the movable portion. When the tail boom is fully unfolded, the reception cone moves back under drive from the cone in the stationary portion until it reaches its engagement point enabling the power transmission to be coupled together.

Thus, such a folding/unfolding device requires the rear power transmission shaft to be capable of moving back a certain amount, and that means it cannot be installed in the immediate proximity of a rear power transmission gearbox or in the immediate proximity of an intermediate power transmission gearbox, in the specific circumstance of a rotorcraft that has one. Furthermore, that type of device also puts a limit on the folding/unfolding angle of the movable portion relative to the stationary portion of the tail boom.

In addition, that technique for folding/unfolding the tail boom requires a folding/unfolding device with conical members that are mechanically complex to make, that are heavy, and that require additional maintenance operations in order to ensure proper operation and to verify the amount of wear on the various moving parts making up such devices.

BRIEF SUMMARY OF THE INVENTION

An object of the present invention is thus to propose a device that makes it possible to overcome the above-mentioned limitations.

Such a device thus seeks to improve the compactness in length and in width of a rotorcraft having a tail boom that is foldable for transport and/or storage purposes. Another object of the invention is to enable the folding/unfolding device to be installed on the tail boom at any location along a rear power transmission shaft.

Furthermore, it should be recalled that a rear power transmission line may comprise a plurality of rear power transmission shafts, and in particular, for example:

a first rear power transmission shaft between the main power transmission gearbox and an intermediate power transmission gearbox; and a second rear power transmission shaft between the intermediate power transmission gearbox and a rear power transmission gearbox.

Thus, a folding/unfolding device of the invention is more generally positioned on the tail boom in register with a rear power transmission shaft upstream from a rear power transmission gearbox and downstream from a main power transmission gearbox in order to guarantee a maximum folding/unfolding angle for the movable portion of the tail boom.

The invention thus relates to a folding/unfolding device for a tail boom that is arranged on the tail boom in association with a rear power transmission shaft upstream from a rear power transmission gearbox and downstream from a main power transmission gearbox mechanically connected to at least one engine of the rotorcraft.

The rear power transmission shaft is suitable for transmitting driving torque and for driving a tail rotor of the rotorcraft in rotation.

Such a folding/unfolding device comprises:

mechanical decoupling/coupling means between two portions of the single rear power transmission shaft and arranged specifically upstream and downstream from the folding/unfolding device; and pivot means enabling a movable portion of the tail boom to move in pivoting relative to a stationary portion of the tail boom, the relative pivoting movement being performed between two distinct extreme positions, namely an unfolded, working position enabling the rear power transmission shaft to transmit driving torque to the tail rotor, and a folded, rest position enabling the overall length of the rotorcraft to be reduced while the engine, the rear power transmission shaft, and the tail rotor are stopped.

This folding/unfolding device is remarkable in that the decoupling/coupling means are motor-driven and can be actuated independently of the pivot means firstly to mechanically decouple the two portions of said single rear power transmission shaft prior to the relative pivoting movement corresponding to folding the movable portion relative to the stationary portion of the tail boom, and secondly to mechanically couple together the two portions of said single rear power transmission shaft after the relative pivoting movement corresponding to unfolding the movable portion relative to the stationary portion of the tail boom.

In other words, such a folding/unfolding device makes it possible to decouple two portions of the rear power transmission shaft in the tail boom prior to beginning any relative pivoting movement between the movable portion and the stationary portion. Furthermore, the decoupling/coupling means may include at least one actuator that may in particular be selected from the group comprising pneumatic, hydraulic, and electrical actuators.

Furthermore, the decoupling/coupling means enable a coupling member such as a jaw clutch to be moved in translation along a direction that is substantially parallel to a longitudinal direction of the rear power transmission shaft. Such a jaw clutch generally has teeth extending radially outwards, with the teeth of the jaw clutch being designed to co-operate with complementary grooves formed in a stationary bell that is secured to the other portion of the rear power transmission shaft.

Furthermore, as mentioned above, in certain particular circumstances, a rotorcraft may have an intermediate power transmission gearbox arranged in a tail boom on a power transmission line, upstream from the rear power transmission gearbox and downstream from the main power transmission gearbox.

Under such particular circumstances, the folding/unfolding device for a tail boom in accordance with the invention is then more particularly arranged in the tail boom in register with a rear power transmission shaft upstream from an intermediate power transmission gearbox and downstream from a main power transmission gearbox that are mechanically connected to at least one engine of the rotorcraft.

Advantageously, the folding/unfolding device may include unlocking/locking means for the unfolded, working position of the movable portion of the tail boom relative to the stationary portion of the tail boom.

In other words, the unlocking/locking means make it possible to avoid any accidental folding of the tail boom. Such locking/unlocking means thus serve to block the pivoting connection between the movable portion and the stationary portion of the tail boom in the unfolded position, with this locking being necessary in the flight configuration of the rotorcraft.

Furthermore, the locking/unlocking means are advantageously motor-driven and may be controlled automatically by the pilot or by any other person entitled to control folding/unfolding of the tail boom of the rotorcraft, such as a mechanic, for example.

In first and second embodiments, the decoupling/coupling means and the unlocking/locking means may be actuated by a common actuator.

Thus, a single actuator, and consequently a single control setpoint for that actuator, can serve both to perform mechanical decoupling/coupling of the rear power transmission shaft and to unlock the relative pivoting movements between the movable portion and the stationary portion of the tail boom.

Under such circumstances, the decoupling/coupling means may include first resilient return means stressed in compression and having free ends bearing respectively on a frame of the stationary portion and on a plane face of a jaw clutch that is movable in translation along a direction parallel to a longitudinal direction of the rear power transmission shaft, and the unlocking/locking means may include second resilient return means stressed in compression and having free ends bearing respectively on the frame of the stationary portion and on a plane face of a rod of the unlocking/locking means.

In this way, even in the event of the common actuator malfunctioning, the decoupling/coupling means and the unlocking/locking means can return respectively into a safe, rest position suitable for avoiding any risk of accident for the rotorcraft.

Thus, the first resilient return means serve to hold the decoupling/coupling means stationary in a coupling position that guarantees the transmission of mechanical power between the two portions of the rear power transmission shaft. The second resilient return means serve to hold the unlocking/locking means stationary in a position for locking relative pivoting between the movable portion and the stationary portion of the tail boom.

In practice, the first resilient return means may enable a first return force to be exerted on the jaw clutch, and the second resilient return means may enable a second return force to be exerted on the rod of the unlocking/locking means, the first return force being less than the second return force.

In this way, the second return force exerted by the second resilient return means serves to guarantee that the rod of the unlocking/locking means remains in a "normally extended", rest position in the event of a power failure of the actuator.

Still in the first and second embodiments, the device may advantageously include a mechanical connection member enabling the decoupling/coupling means and the unlocking/locking means to be actuated simultaneously with the common actuator.

In other words, such a mechanical connection member enables the movement of the common actuator to be transmitted simultaneously to the decoupling/coupling means and to the unlocking/locking means.

Thus, in the first embodiment, the mechanical connection member may include at least one link, at least one crank, referred to as the "connection crank", having at least one degree of freedom to move in rotation relative to the frame, and a pusher enabling a thrust force to be exerted on the plane face of the jaw clutch, the free ends of the link being in ball-joint connection respectively with a free end of the rod and with a free end of a lever arm of the crank, the mechanical connection member enabling the common actuator to move the movable jaw clutch in translation along a direction parallel to the longitudinal direction of the rear power transmission shaft.

In other words, the common actuator can act directly to move in translation a rod of the unlocking/locking means in a first translation direction.

Initially, the link and the connection crank serve to transform the movement in translation of the actuator into a pivot movement of the crank relative to the frame of the stationary portion of the tail boom.

Thereafter, the pusher of the connection crank serves to transform the pivot movement of the connection crank into a movement in translation of the jaw clutch in a second direction corresponding to the direction parallel to the longitudinal direction of the rear power transmission shaft.

Furthermore, in the second embodiment, the mechanical connection member may include at least one projection suitable for controlling the movement in translation of a jaw clutch, such a projection being arranged in a slideway connection with a frame of the stationary portion of the tail boom and including a free end that is arranged in annular linear connection with a free end of a rod, the rod being arranged in a helical connection with the frame to transform the movement in translation of at least one finger of the actuator into a combined movement in rotation and in translation of the rod relative to the frame.

Thus, under such circumstances, as in the first embodiment, the common actuator can act directly to move in translation a rod of the unlocking/locking means in translation in a first translation direction.

Firstly, the helical connection serves to transform the movement in translation of the actuator into a movement in rotation and in translation of the rod relative to the frame of the stationary portion of the tail boom.

Thereafter, the annular linear connection with the projection and the slideway connection between the projection and the frame serve to transform the movement in rotation of the rod into a movement in translation of the jaw clutch along a second direction corresponding to the direction parallel to the longitudinal direction of the rear power transmission shaft.

In a third embodiment, the decoupling/coupling means may include a first actuator, and the unlocking/locking means may include a second actuator distinct from the first actuator.

Under such circumstances, the decoupling/coupling means and the unlocking/locking means may be actuated in independent manner simultaneously or one after the other, the decoupling/coupling means then being actuated before the unlocking/locking means. This serves to avoid any risk of the tail boom folding while a rear power transmission shaft is still coupled between its stationary portion and its movable portion.

In practice, whatever the embodiment in question, the pivot means may have a pivot axis inclined at a predetermined angle $\alpha$ relative to a plane P perpendicular to a longitudinal direction of the rear power transmission shaft, such a predetermined angle $\alpha$ lying in the range 20 degrees to 30 degrees.

Thus, such an angle $\alpha$ of inclination of the pivot axis between the movable portion of the tail boom and the stationary portion makes it possible in particular for a horizontal stabilizer arranged on the movable portion to pass under the stationary portion, while avoiding any collision between the blades of the tail rotor and the ground.

Such a predetermined angle of inclination $\alpha$ may in particular be selected to be equal to 26 degrees, thus making it possible to fold the tail boom through an angle of about 170 degrees.

The present invention also provides a rotorcraft having a tail rotor arranged on a tail boom, the tail rotor being driven in rotation by means of at least one engine and a rear power transmission shaft, and the tail boom including a movable portion movable in pivoting relative to a stationary portion between two distinct extreme positions, namely an unfolded, working position enabling the rear folding/unfolding to transmit driving torque to the tail rotor, and a folded, rest position enabling the overall length of the rotorcraft to be reduce when the engine, the rear power transmission shaft and the tail rotor are all stopped.

In accordance with the invention, the rotorcraft includes a folding/unfolding device for a tail boom as described above.

In other words, such a rotorcraft includes motor-driven decoupling/coupling means in a tail boom enabling the rear power transmission shaft to be mechanically decoupled/coupled prior to causing the movable portion of the tail boom to move in pivoting relative to the stationary portion.

The rotorcraft thus presents improved overall length and width, serving in particular to make it easier to transport or store in a ship, in an airplane, or indeed in a hangar.

Finally, as mentioned above, the invention relates to a folding/unfolding method for folding/unfolding a tail boom of a rotorcraft including at least one tail rotor. Such a tail rotor is thus driven in rotation by means of at least one engine and at least one rear power transmission shaft. Such a folding/unfolding method is performed when the at least one engine, the rear power transmission shaft, and the tail rotor are all stopped.

In addition, the folding/unfolding method comprises:

a first step consisting in mechanically decoupling two portions of a single rear power transmission shaft;

an unlocking, second step for unlocking a movable portion of the tail boom when in an unfolded, working position relative to a stationary portion of the tail boom, the unfolded, working position of the movable portion enabling the rear power transmission shaft to transmit driving torque to the tail rotor;

a folding, third step of folding the movable portion relative to the stationary portion, the folding corresponding to moving the movable portion in relative pivoting through an angle between two distinct extreme positions, namely the unfolded, working position and a folded, rest position enabling the overall length of the rotorcraft to be reduced;

an unfolding, fourth step of unfolding the movable portion relative to the stationary portion, the unfolding corresponding to a relative pivoting movement, through an angle of the movable portion between two distinct extreme positions, namely the folded, rest position and the unfolded, working position;

a fifth step consisting in mechanically coupling together the two portions of the single rear power transmission shaft; and a locking, sixth step of locking the movable portion of the tail boom in the unfolded, working position relative to the stationary portion of the tail boom.

According to the invention, this folding/unfolding method comprises:

the first step and the third step are performed independently of each other, the first step being performed before the third step; and the fifth step and the fourth step are performed independently of each other, the fifth step being performed after the fourth step.

In this way, the actions consisting in decoupling/coupling the two portions of the single rear power transmission shaft and in causing the movable portion of the tail boom to pivot about a pivot axis are dissociated and made mutually independent.

Furthermore, in order to perform the third step of imparting relative pivoting movement between the two portions of the tail boom, it is also necessary beforehand to perform an unlocking, second step in an unfolded, working position of the movable portion relative to the stationary portion. This second step can thus be performed before, simultaneously with, or after the first step of the folding/unfolding method.

In practice, the two portions of the single rear power transmission shaft may be mechanically decoupled/coupled via motor-drive decoupling/coupling means enabling a jaw clutch to be moved axially in translation relative to a first portion of the rear power transmission shaft in a longitudinal direction of the rear power transmission shaft, the jaw clutch being suitable for decoupling/coupling with a bell of complementary shape secured to a second portion of the rear power transmission shaft.

Under such circumstances, decoupling/coupling is performed between the two portions of the rear power transmission shaft by independently actuating the movement in translation of the jaw clutch relative to the pivoting movement of the movable portion of the tail boom relative to the stationary portion. The motor-driven decoupling/coupling means can thus be actuated prior to the third step of folding the movable portion and then after the fourth step of unfolding the movable portion.

Advantageously, the first step may be performed simultaneously with the unlocking, second step in the unfolded, working position of the movable portion relative to the stationary portion, and likewise, the fifth step may be performed simultaneously with the locking, sixth step in the unfolded, working position of the movable portion relative to the stationary portion.

Thus, under such circumstances, once the mechanical decoupling has been achieved on the rear power transmission shaft, it is certain that the unlocking enabling the movable portion to pivot has been performed.

Naturally, as mentioned above, and in other implementations of the folding/unfolding method, the unlocking, second step may also be performed before or after the first step of mechanically decoupling the two portions of a single rear power transmission shaft.

Furthermore, and in a first implementation of the folding/unfolding method, the two portions may be mechanically decoupled/coupled together and the movable portion of the tail boom may be unlocked/locked in the unfolded, working position with a single actuator.

Under such circumstances, a single control setpoint is then needed to perform both operations. The common actuator is suitable for acting simultaneously to perform mechanical decoupling/coupling of the two portions of the rear power transmission shaft and unlocking/locking of the movable portion relative to the stationary portion in the unfolded, working position.

In a second implementation of the folding/unfolding method, the two portions of the single rear power transmission shaft may be mechanically decoupled/coupled together with a first actuator and the movable portion of the tail boom may be unlocked/locked in the unfolded, working position with a second actuator distinct from the first actuator.

In this way, the action consisting in decoupling/coupling the two portions of the rear power transmission shaft and in unlocking/locking the movable portion of the tail boom in the unfolded, working position can be operated independently.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 1 is a side view of a rotorcraft in accordance with the invention;

FIG. 2 is a plan view of a rotorcraft in accordance with the invention;

FIG. 3 is a side view of a rotorcraft showing the two extreme positions of a movable tail boom portion in accordance with the invention;

Figure 4:
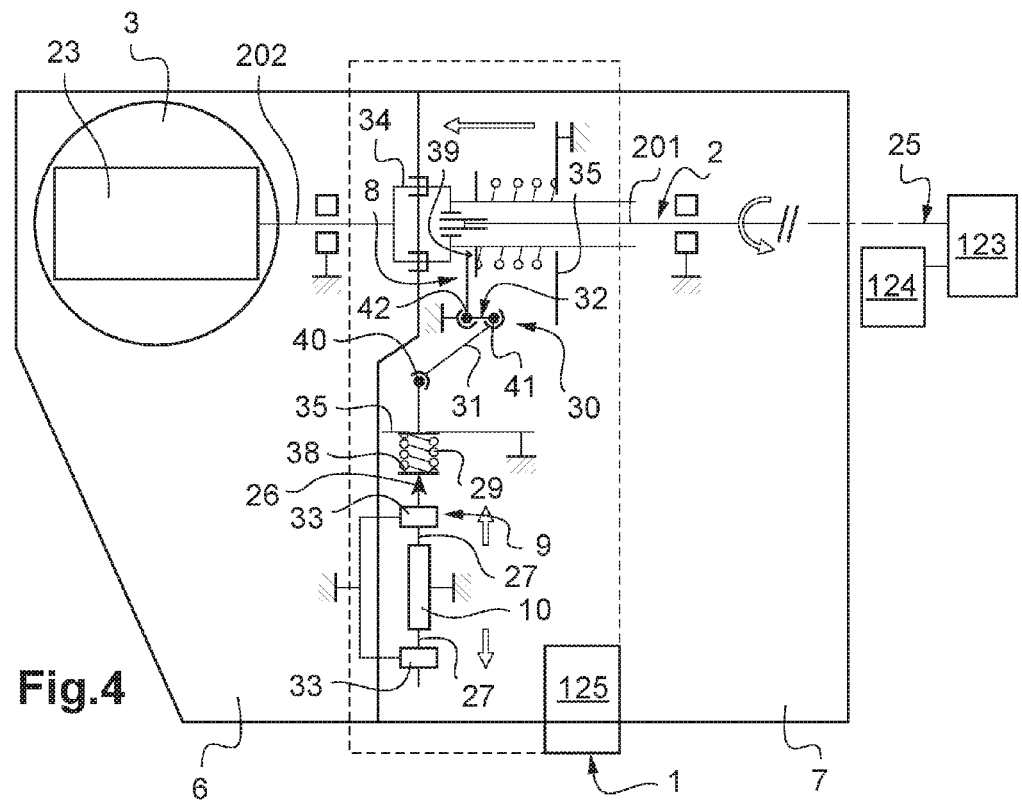
FIGS. 4 and 5 are diagrams of a first embodiment of a folding/unfolding device in accordance with the invention.

Elements that are present in more than one of the figures are given the same references in each of them.

DETAILED DESCRIPTION OF THE INVENTION

As mentioned above, the invention relates to a device for folding/unfolding a rotorcraft tail boom.

Thus, and as shown in FIG. 1, the rotorcraft 4 includes a folding/unfolding device 1 arranged in a tail boom 5. Such a folding/unfolding device 1 includes pivot means 125 making it possible in particular for a movable portion 6 of the tail boom 5 supporting a tail rotor 3 to be moved in a pivoting movement.

Furthermore, such a pivoting movement takes place about a pivot axis 22 that slopes at an angle α relative to a plane P perpendicular to a longitudinal direction 25 parallel to a rear power transmission shaft used for transmitting driving torque to the tail rotor 3. Furthermore, such an angle α advantageously lies in the range 20 degrees to 30 degrees and may more particularly be equal to 26 degrees so as to guarantee a maximum folding/unfolding angle for the movable portion relative to the stationary portion 7 of the tail boom 5.

As shown in FIG. 2, a folding/unfolding angle β/−β may advantageously present a maximum amplitude of about 170 degrees. Furthermore, the movable portion 6 of the tail boom 5 may include a horizontal stabilizer 13, e.g. of the horizontal tail plane type, suitable for being positioned under the stationary portion 7 of the tail boom 5. Furthermore, when seen from above, the folding/unfolding angle β/−β corresponds to a V-angle of the movable portion 6 relative to the stationary portion 7 of the tail boom 5.

Such a maximum amplitude for the folding/unfolding angle β/−β is thus made possible by the axis of rotation 22 sloping at an angle α relative to the plane P. It thus makes it possible to avoid increasing the overall width L of the rotorcraft 4 when folding the movable portion 6.

In addition, and as shown in FIG. 3, the pivot means 125 enable the movable portion 6 to be pivoted between two extreme positions 20 and 21 corresponding respectively to an unfolded, working position 20 and to a folded, rest position 21, thereby enabling the overall length of the rotorcraft 4 to be reduced. Advantageously, in this rest position 21 of the movable portion 6, the blades 14 of the tail rotor do not touch the ground.

In the invention, and as shown in FIGS. 4 to 8, the folding/unfolding device 1, 71, 81, 11 also includes motor-driven decoupling/coupling means 8, 101, 118, 18 for mechanically decoupling/coupling two portions 201-211-271-281, 202-212-272-282 of a single rear power transmission shaft 2, 72, 82, 12 for the tail rotor 3, prior to actuating the pivot means 125 and thus prior to proceeding with folding/unfolding the movable portion 6 of the tail boom 5.

Advantageously, the folding/unfolding device 1, 71, 81, may also include unlocking/locking means 9, 109, 119, 19 enabling the movable portion 6 to be held stationary in the unfolded, working position 21. In addition, such a folding/unfolding device 1, 71, 81, 11 may also include "blocking" means (not shown) serving to hold the movable portion 6 stationary in the folded, rest position 20.

Figure 5:
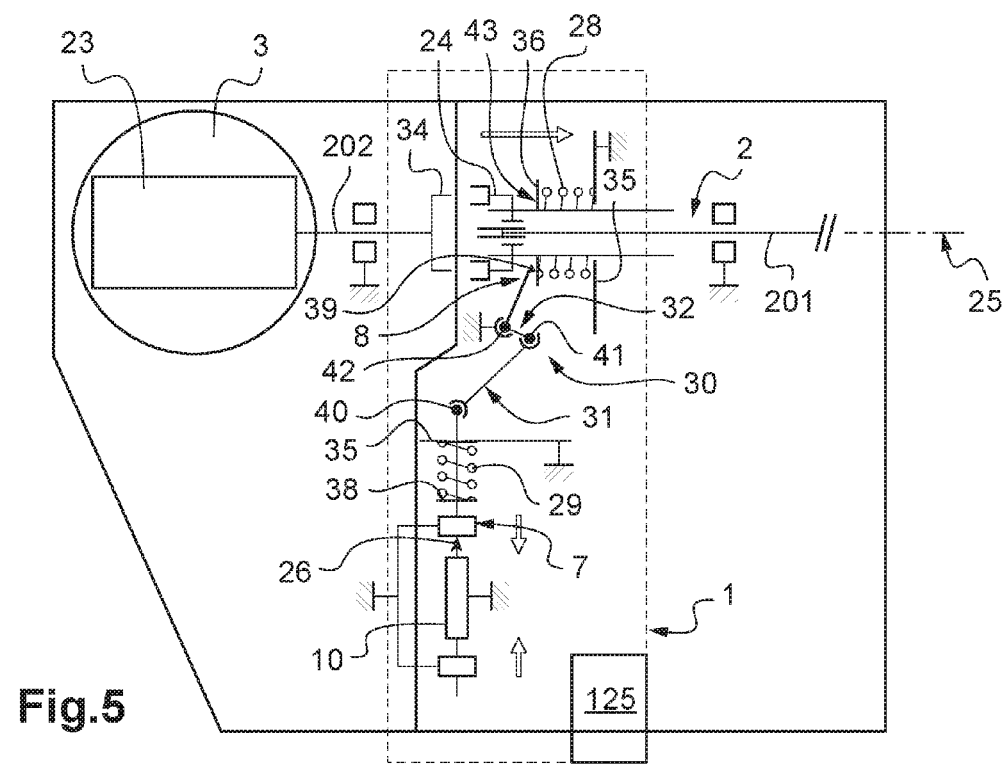

Furthermore, the decoupling/coupling means 8, 108, 118, 18 and the unlocking/locking means 9, 109, 119, 19 may be made in various different embodiments for the purpose of mechanically coupling/decoupling the two portions 201-271-281-211 and 202-272-282-212 of the rear power transmission shaft 2, 72, 82, 12 independently of the pivoting movement of the movable portion 6;

Thus, in a first embodiment as shown in FIGS. 4 and 5, the decoupling/coupling means 8 and the unlocking/locking means 9 may include a common actuator 10 such as a hydraulic, pneumatic, or indeed electrical actuator. The common actuator 10 serves to move two fingers 27 that are arranged on either side of the body of the actuator 10 in two opposite directions. Such fingers 27 co-operate with respective fittings or hinges 33, thus performing the locking/unlocking function for the movable portion 6 in the unfolded position 20 so as to prevent any involuntary opening of the tail boom 5.

Furthermore, in addition to the locking function, one of the two fingers 27 also serves to drive and move in translation a rod 26 for transmitting the movement in translation produced by the actuator 10 to the decoupling/coupling means 8. To do this, the movement in translation of the rod 26 is transmitted to a connection member 30 and then to the decoupling/coupling means 8. Such a rod 26 is thus arranged on the same axis as the fingers 27 of the actuator 10.

In addition, the connection member 30 includes at least one link 31 and at least one crank 32 for modifying the travel direction in translation along a direction parallel to a longitudinal direction 25 of the rear power transmission shaft 2. The travel direction in translation of the fingers 27 is oriented parallel to the pivot axis between the movable portion 6 and the stationary portion 7 and is thus inclined at an angle α relative to a plane P perpendicular to the longitudinal direction 25 of the rear power transmission shaft 2.

As shown in FIG. 4, the common actuator 10 is arranged in a position for locking the movable portion 6 relative to the stationary portion 7 that corresponds to the fingers 27 extending out from the body of the actuator 10.

Activating the actuator 10 in this locking position as shown in FIG. 4 serves firstly to relax first resilient return means 28 acting on a jaw clutch 24 that is movable in translation along the longitudinal direction 25 of the rear power transmission shaft 2, and secondly to compress second resilient return means 29.

The first resilient return means 28 are subjected to compression between a plane face 36 of the jaw clutch 24 and a frame 35 secured to the stationary portion 7 of the tail boom.

Furthermore, the force exerted by the actuator 10 in order to reach this locking position is advantageously selected to be greater than the compression force exerted by the second resilient return means 29 on the rod 26. The second resilient return means 29 is subjected to compression between a pane face 38 of the rod 26 and the frame 35.

In the "normally extended" position of the actuator 10, as shown in FIG. 4, driving torque coming from the engine 124 via a main power transmission gearbox 123 can thus be transmitted between the portions 201 and 202 of the rear power transmission shaft 2 to a rear power transmission gearbox 23 and a tail rotor 3. To do this, the driving torque is transmitted by the portion 201 to the jaw clutch 24 and then the teeth of the jaw clutch 24 co-operate with grooves of complementary shape formed in the bell 34 so as to transmit the driving torque to the bell 34 secured to the portion 202 of the rear power transmission shaft 2.

Furthermore, in the event of a failure of the actuator 10, e.g. as a result of a leak or a break in the hydraulic feed circuit of the actuator 10, the fingers 27 remain in the "extended locking" position so as to guarantee that the movable portion 6 remains in its extreme unfolded, working position 20. In order to obtain such a result, the second resilient return force exerted by the second resilient return means 29 is selected to be greater than the first resilient return force exerted by the first resilient return means 28.

In this way, and as shown in FIG. 5, when the actuator 10 is operated to unlock the movable portion 6, the rod 26 moves back towards the body of the actuator 10, the second resilient return means 29 expand, thereby compressing the first resilient return means 28 via the connection member 30. The crank 32 may have a lever arm 41 serving in particular to increase the force produced by the second resilient return means. The lever arm 41 thus makes it possible to obtain a second resilient return force that is greater than the first force while using first and second resilient return means 28 and 29 that have the same stiffness.

In addition, the link 31 of the mechanical connection member 30 is provided with respective ball joints at both of its free ends, one engaged with a free end 40 of the rod 26 and the other with the lever arm 41 of the crank 32. Such a crank 32 also includes at least one degree of freedom to move in rotation arranged at a connection 42 with the frame 35 of the stationary portion 7. Such a connection 42 is thus selected from the group comprising pivot connections, i.e. having one degree of freedom to move in rotation, finger ball joint connections, i.e. having two degrees of freedom to move in rotation, and ball joint connections, i.e. having three degrees of freedom to move in rotation.

Finally, the movement in rotation transmitted to the crank 32 serves to move a pusher 39 in point or linear contact with a plane face 43 of the jaw clutch 24 opposite from the plane bearing face 36 of the first resilient return means 28. The pusher 39 thus enables the jaw clutch 24 to be moved in translation along the longitudinal direction 25 of the rear power transmission shaft 2.

Figure 6:
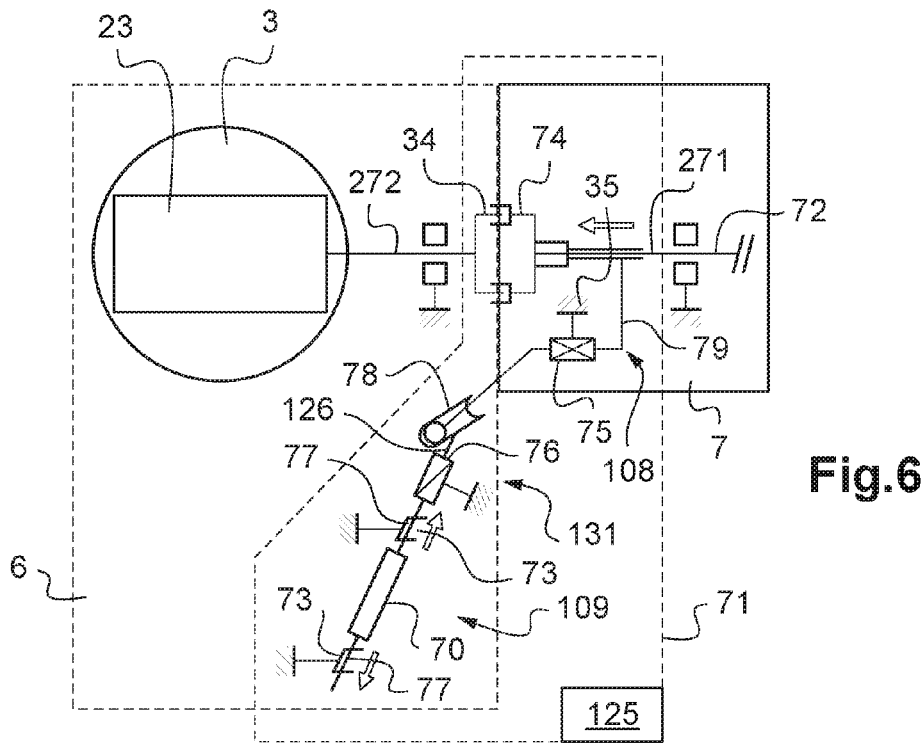
FIGS. 6 and 7 are diagrams showing two variants of a second embodiment of a folding/unfolding device in accordance with the invention.
Figure 7:
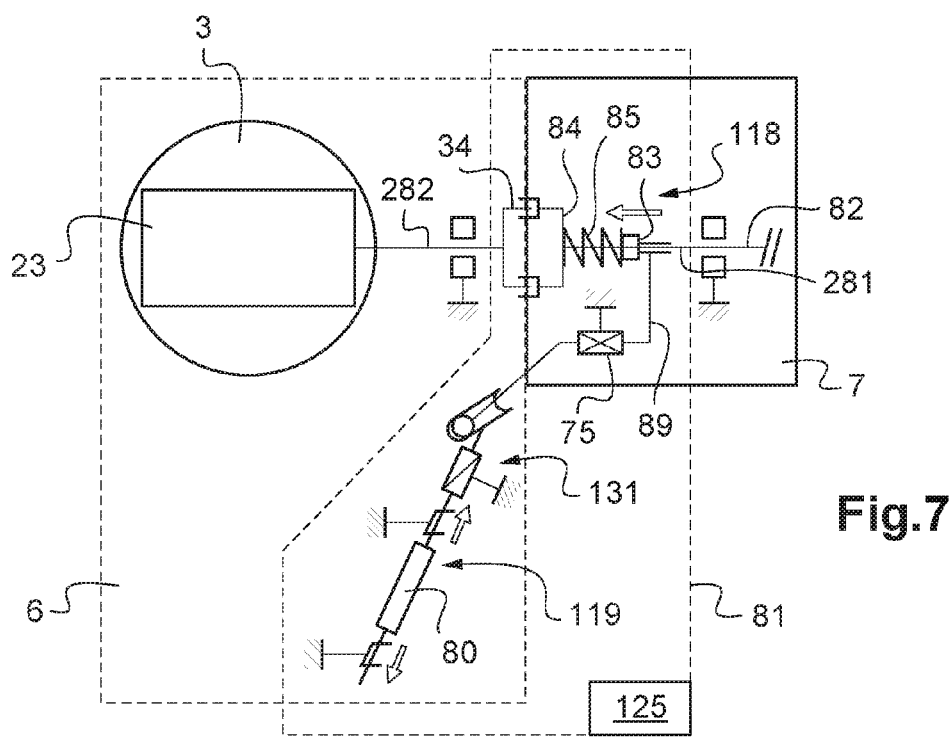

As shown in FIGS. 6 and 7, in two distinct variants of a second embodiment, the mechanical connection member 130, 131 of the folding/unfolding device 71, 81 may be in a form that is different from that shown in FIGS. 4 and 5.

Thus, as shown in FIGS. 6 and 7, the mechanical connection member 130, 131 serves to move the jaw clutch 74, 84 in translation along a direction parallel to the rear power transmission shaft 72, 82 by means of a single actuator 70, 80 as in FIGS. 4 and 5. Nevertheless, in this second embodiment, the mechanical connection member 130, 131 includes a projection 79, 89 arranged in a slideway connection 75 with the frame 35.

In addition, a free end of the projection 79, 89 is arranged in an annular linear connection 78 with a free end of a rod 126. Such an arrangement then serves to transform the movement in translation of the fingers 77 of the actuator 70, 80 into a movement along the longitudinal direction of the rear folding/unfolding 72, 82.

Furthermore, the fingers 77 co-operate with the hinges 73 to form the unlocking/locking means 109, 119 of the folding/unfolding device 71, 81. They also enable the rod 126 to be moved in translation, which rod is also in helical connection 76 with the frame 35.

As shown in FIG. 6, in a first variant of the second embodiment, the decoupling/coupling means 108 include the jaw clutch 74 formed as a unit together with the projection 79.

Nevertheless, as shown in FIG. 7, in a second variant of the second embodiment, the decoupling/coupling means 118 have the jaw clutch 84 and the projection 79 separate from each other. In this configuration, the projection 89 is secured to a fork 83 that is movable in translation relative to the rear power transmission shaft 82 and to the jaw clutch 84 in a direction parallel to the longitudinal direction of the rear power transmission shaft 82.

In addition, resilient return means 85 may be compressed and arranged between the jaw clutch 84 and the fork 83 so as to ensure that the jaw clutch 84 is held securely in the coupled position with the bell 34 that is secured to the portion 271 of the power transmission shaft 72. Such a bell 34 thus constitutes a member for receiving driving torque from the folding/unfolding device 71.

As mentioned above, the decoupling/coupling means 108, 118 shown herein are motor-driven and may be actuated independently of the pivot means 125 in order to enable the two portions 271-281, 272-282 of the rear power transmission shaft 72, 82 to be mechanically decoupled prior to causing the movable portion 6 of the tail boom to move in pivoting relative to the stationary portion 7 of the tail boom 5.

Figure 8:
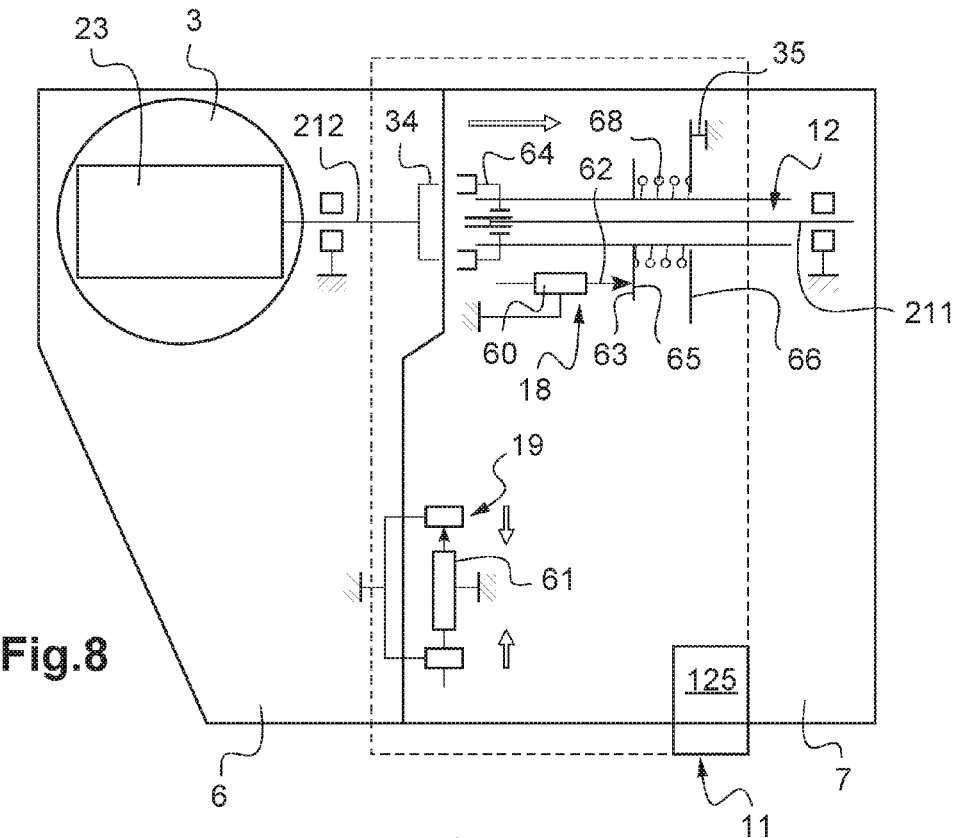
FIG. 8 is a diagram of a third embodiment of a folding/unfolding device in accordance with the invention.

Finally, in a third embodiment, as shown in FIG. 8, the decoupling/coupling means 18 include an independent first actuator 60, and the unlocking/locking means 19 have a second actuator 61 that is different from the first actuator 60.

As above, such as a third embodiment enables the decoupling/coupling means 18 and the unlocking/locking means 19 to be actuated individually and independently prior to actuating the pivot means 125.

Under such circumstances, a finger 62 of the actuator 60 can push directly against a plane face 63 of the jaw clutch 64 in order to move the jaw clutch 64 in translation relative to the rear power transmission shaft 12, thereby achieving mechanical coupling/decoupling between the two portions 211, 212 of the rear power transmission shaft 12.

Furthermore, in the event of a failure of the actuator 60 or of its power supply, e.g. a hydraulic power supply, resilient return means 68 subjected to compression serve to couple the jaw clutch 64 automatically with the bell 34 situated facing it. By way of example, such resilient return means 68 may be arranged between a plane face 66 of the frame 35 and a plane face 65 of the jaw clutch 64 opposite from the plane face 63.

Furthermore, whatever the embodiment, the movable portion 6 can be pivoted relative to the stationary portion 7 by hand by an operator such as a mechanic, or automatically by means of a specific actuator that is not shown in FIGS. 4 to 8.

Figure 9:
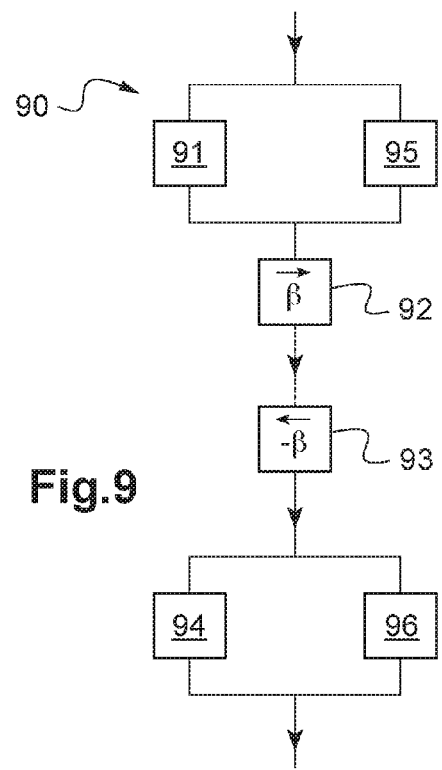
FIG. 9 is a fragmentary flow chart of the folding/unfolding method in accordance with the invention.

As shown in FIG. 9, the invention also relates to a method 90 of folding/unfolding a rear power transmission shaft 2, 72, 82, 12 of a tail rotor 3 of a rotorcraft 4.

Such a tail rotor 3 is driven in rotation by means of at least one engine 124 and a rear power transmission shaft 2, 72, 82, 12, and it is arranged on a tail boom 5.

Furthermore, such a folding/unfolding method 90 is performed when the motor 124, the rear power transmission shaft 2, 72, 82, 12, and the tail rotor 3 are all stopped.

The folding/unfolding method 90 also includes a first step 91 consisting in mechanically decoupling two portions of a single rear power transmission shaft.

Such a method 90 also includes a folding, third step 92 consisting in moving the movable portion 6 of a tail boom 5 in pivoting through an angle β relative to the stationary portion 7 of the tail boom 5. Such folding is performed to enable the rotorcraft 4 to be stored or transported by reducing at least its overall length in this way.

The method 90 then includes an unfolding, fourth step 93 consisting in moving the movable portion 6 of a tail boom 5 in pivoting through an angle –β relative to the stationary portion 7 of the tail boom 5. Such unfolding is used when the rotorcraft 4 is to be put into operation and it is used once storage and transport of the rotorcraft are terminated.

Finally, such a method 90 includes a fifth step 94 consisting in mechanically coupling together the two portions of the single rear power transmission shaft, in particular when it is desired to use the rotorcraft 4.

As explained above, the third and fourth steps 92 and 93 may be performed manually by an operator or automatically by means of a specific hydraulic, pneumatic, or electrical actuator serving to pivot the movable portion of the tail boom relative to the stationary portion.

In this folding/unfolding method 90, prior to the folding third step 92, the first step 91 is performed independently, which step consists in mechanically decoupling the two portions of the rear power transmission shaft.

Thus, such a first step 91 is motor-driven or automatic and may advantageously be executed simultaneously with an unlocking, second step 95 that consists in unlocking the movable portion of the tail boom while it is arranged in its unfolded, working position 20.

Likewise, in this folding/unfolding method 90, after the unfolding, fourth step 93, the fifth step 94 consisting in mechanically coupling together the two portions of the rear power transmission shaft is performed independently.

Thus, such a fifth step 94 may be motor-driven or automatic and it may advantageously be executed simultaneously with a locking, sixth step 96 that consists in locking the movable portion of the tail boom once it is arranged in its unfolded, working position 20.

The first step 91 and the unlocking, second step 95 may be performed by various means corresponding to different embodiments.

Thus, in first and second embodiments, the first step 91 and the unlocking, second step 95 may be performed by using a common actuator 10.

In contrast, and in a third embodiment, the first step 91 may be performed by means of a first actuator 60 and the unlocking, second step 95 may be performed by means of a second actuator 61 that is different from the first actuator 60.

Likewise, the fifth step 94 that consists in mechanically coupling together the two portions of the single rear power transmission shaft, and the locking, sixth step 96 may be performed by various means corresponding to different embodiments, but corresponding to the means enabling the first step 91 and the unlocking, second step 95 to be performed.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A folding/unfolding device for folding/unfolding a tail boom of a rotorcraft, the folding/unfolding device being arranged on the tail boom in association with a rear power transmission shaft upstream from a rear power transmission gearbox and downstream from a main power transmission gearbox mechanically connected to at least one engine of the rotorcraft, the rear power transmission shaft being suitable for transmitting driving torque and for driving a tail rotor of the rotorcraft in rotation, the folding/unfolding device comprising:

mechanical decoupling/coupling means between two portions of the single rear power transmission shaft and arranged specifically upstream and downstream from the folding/unfolding device; and pivot means enabling a movable portion of the tail boom to move in pivoting relative to a stationary portion of the tail boom, the relative pivoting movement being performed between two distinct extreme positions, namely an unfolded, working position enabling the rear power transmission shaft to transmit driving torque to the tail rotor, and a folded, rest position enabling the overall length of the rotorcraft to be reduced while the engine, the rear power transmission shaft, and the tail rotor are all stopped;

wherein the decoupling/coupling means are motor-driven and can be actuated independently of the pivot means firstly to mechanically decouple the two portions of the single rear power transmission shaft prior to the relative pivoting movement corresponding to folding the movable portion relative to the stationary portion of the tail boom, and secondly to mechanically couple together the two portions of the single rear power transmission shaft after the relative pivoting movement corresponding to unfolding the movable portion relative to the stationary portion of the tail boom.

2. A device according to claim 1, wherein the folding/unfolding device includes unlocking/locking means for the unfolded, working position of the movable portion of the tail boom relative to the stationary portion of the tail boom.

3. A device according to claim 2, wherein the decoupling/coupling means and the unlocking/locking means are actuated by a common actuator.

4. A device according to claim 3, wherein the decoupling/coupling means include first resilient return means stressed in compression and having free ends bearing respectively on a frame of the stationary portion and on a plane face of a jaw clutch that is movable in translation along a direction parallel to a longitudinal direction of the rear power transmission shaft, and the unlocking/locking means include second resilient return means stressed in compression and having free ends bearing respectively on the frame of the stationary portion and on a plane face of a rod of the unlocking/locking means.

5. A device according to claim 4, wherein the first resilient return means enable a first return force to be exerted on the jaw clutch, and the second resilient return means enable a second return force to be exerted on the rod of the unlocking/locking means, the first return force being less than the second return force.

6. A device according to claim 3, wherein the folding/unfolding device includes a mechanical connection member enabling the decoupling/coupling means and the unlocking/locking means to be actuated simultaneously with the common actuator.

7. A device according to claim 4, wherein the mechanical connection member includes at least one link, at least one crank having at least one degree of freedom to move in rotation relative to the frame, and a pusher enabling a thrust force to be exerted on the plane face of the jaw clutch, the free ends of the link being in ball-joint connection respectively with a free end of the rod and with a free end of a lever arm of the crank, the mechanical connection member enabling the common actuator to move the movable jaw clutch in translation along a direction parallel to the longitudinal direction of the rear power transmission shaft.

8. A device according to claim 6, wherein the mechanical connection member includes at least one projection suitable for controlling the movement in translation of a jaw clutch, the projection being arranged in a slideway connection with a frame of the stationary portion of the tail boom and including a free end that is arranged in annular linear connection with a free end of a rod, the rod being arranged in a helical connection with the frame to transform the movement in translation of at least one finger of the actuator into a combined movement in rotation and in translation of the rod relative to the frame.

9. A device according to claim 2, wherein the decoupling/coupling means include a first actuator, and the unlocking/locking means include a second actuator distinct from the first actuator.

10. A device according to claim 1, wherein the pivot means have a pivot axis inclined at a predetermined angle $\alpha$ relative to a plane P perpendicular to a longitudinal direction of the rear power transmission shaft, the predetermined angle $\alpha$ lying in the range 20 degrees to 30 degrees.

11. A rotorcraft having a tail rotor arranged on a tail boom, the tail rotor being driven in rotation by means of at least one engine and a rear power transmission shaft, and the tail boom including a movable portion movable in pivoting relative to a stationary portion between two distinct extreme positions, namely an unfolded, working position enabling the rear folding/unfolding to transmit driving torque to the tail rotor, and a folded, rest position enabling the overall length of the rotorcraft to be reduce when the engine, the rear power transmission shaft and the tail rotor are all stopped, wherein the rotorcraft includes a folding/unfolding device for a tail boom according to claim 1.

12. A folding/unfolding method for folding/unfolding a tail boom of a rotorcraft including at least one tail rotor, the tail rotor being driven in rotation by means of at least one engine and at least one rear power transmission shaft, the folding/unfolding method being performed when the at least one engine, the rear power transmission shaft, and the tail rotor are all stopped, the folding/unfolding method comprising:

a first step consisting in mechanically decoupling two portions of a single rear power transmission shaft;

an unlocking, second step for unlocking a movable portion of the tail boom when in an unfolded, working position relative to a stationary portion of the tail boom, the unfolded, working position of the movable portion enabling the rear power transmission shaft to transmit driving torque to the tail rotor;

a folding, third step of folding the movable portion relative to the stationary portion, the folding corresponding to moving the movable portion in relative pivoting through an angle between two distinct extreme positions, namely the unfolded, working position and a folded, rest position enabling the overall length of the rotorcraft to be reduced;

an unfolding, fourth step of unfolding the movable portion relative to the stationary portion, the unfolding corresponding to a relative pivoting movement, through an angle of the movable portion between two distinct extreme positions, namely the folded, rest position and the unfolded, working position;

a fifth step consisting in mechanically coupling together the two portions of the single rear power transmission shaft; and a locking, sixth step of locking the movable portion of the tail boom in the unfolded, working position relative to the stationary portion of the tail boom;

wherein:

the first step and the third step are performed independently of each other, the first step being performed before the third step; and the fifth step and the fourth step are performed independently of each other, the fifth step being performed after the fourth step.

13. A method according to claim 12, wherein the two portions of the single rear power transmission shaft are mechanically decoupled/coupled via motor-drive decoupling/coupling means enabling a jaw clutch to be moved axially in translation relative to a first portion of the rear power transmission shaft in a longitudinal direction of the rear power transmission shaft, the jaw clutch being suitable for decoupling/coupling with a bell of complementary shape secured to a second portion of the rear power transmission shaft.

14. A method according to claim 12, wherein the first step is performed simultaneously with the unlocking, second step in the unfolded, working position of the movable portion relative to the stationary portion, and the fifth step is performed simultaneously with the locking, sixth step in the unfolded, working position of the movable portion relative to the stationary portion.

15. A method according to claim 12, wherein the two portions of the single rear power transmission shaft are mechanically decoupled/coupled together and the movable portion of the tail boom is unlocked/locked in the unfolded, working position with a single actuator.

16. A method according to claim 12, wherein the two portions of the single rear power transmission shaft are mechanically decoupled/coupled together with a first actuator and the movable portion of the tail boom is unlocked/locked in the unfolded, working position with a second actuator distinct from the first actuator.

* * * * *